Jan. 9, 1968   L. D. WATKINS   3,362,242
SHEAVE DRIVE

Filed June 24, 1965   2 Sheets-Sheet 1

INVENTOR.
LUCIUS D. WATKINS
BY
Wheeler, Wheeler & Wheeler
ATTORNEYS

Jan. 9, 1968   L. D. WATKINS   3,362,242
SHEAVE DRIVE
Filed June 24, 1965   2 Sheets-Sheet 2

INVENTOR.
LUCIUS D. WATKINS
BY
Wheeler, Wheeler & Wheeler
ATTORNEYS

United States Patent Office 3,362,242
Patented Jan. 9, 1968

3,362,242
SHEAVE DRIVE
Lucius D. Watkins, Hartland, Wis., assignor to Outboard Marine Corporation, Waukegan, Ill., a corporation of Delaware
Filed June 24, 1965, Ser. No. 466,711
8 Claims. (Cl. 74—230.17)

ABSTRACT OF THE DISCLOSURE

Disclosed herein is a variable speed sheave drive including a movable sheave member which is biased to a remote position with respect to a fixed sheave by a spring which is coaxial with the axis of sheave rotation and is located, at least in part, in a pocket in the hub of the movable sheave member.

This invention relates to power transmission devices, and more particularly, to sheave drives for use with power transmission belts.

An important object of the present invention is to provide a power transmission device in the form of a sheave drive which is adapted to selectively transmit power to a belt when the sheave drive is rotated above a predetermined speed. In the disclosed construction, an axially separable sheave is mounted on a drive shaft which is connected to a suitable power source. The axially separable sheave includes a pair of members having corresponding flanges adapted to drivingly engage a power transmission belt. One of the members is axially movable and normally spaced from the other member so that the respective flanges do not drivingly engage the belt, thereby providing a neutral drive condition. Means operable upon rotation of the shaft above a predetermined speed is provided for moving the movable member to a power transmitting position wherein the respective flanges can drivingly engage the belt to provide a drive condition. Manually operable means is provided for selectively locking the sheave drive in the neutral condition.

Other objects and advantages will become apparent from the following description and the accompanying drawings in which.

Figure 1:
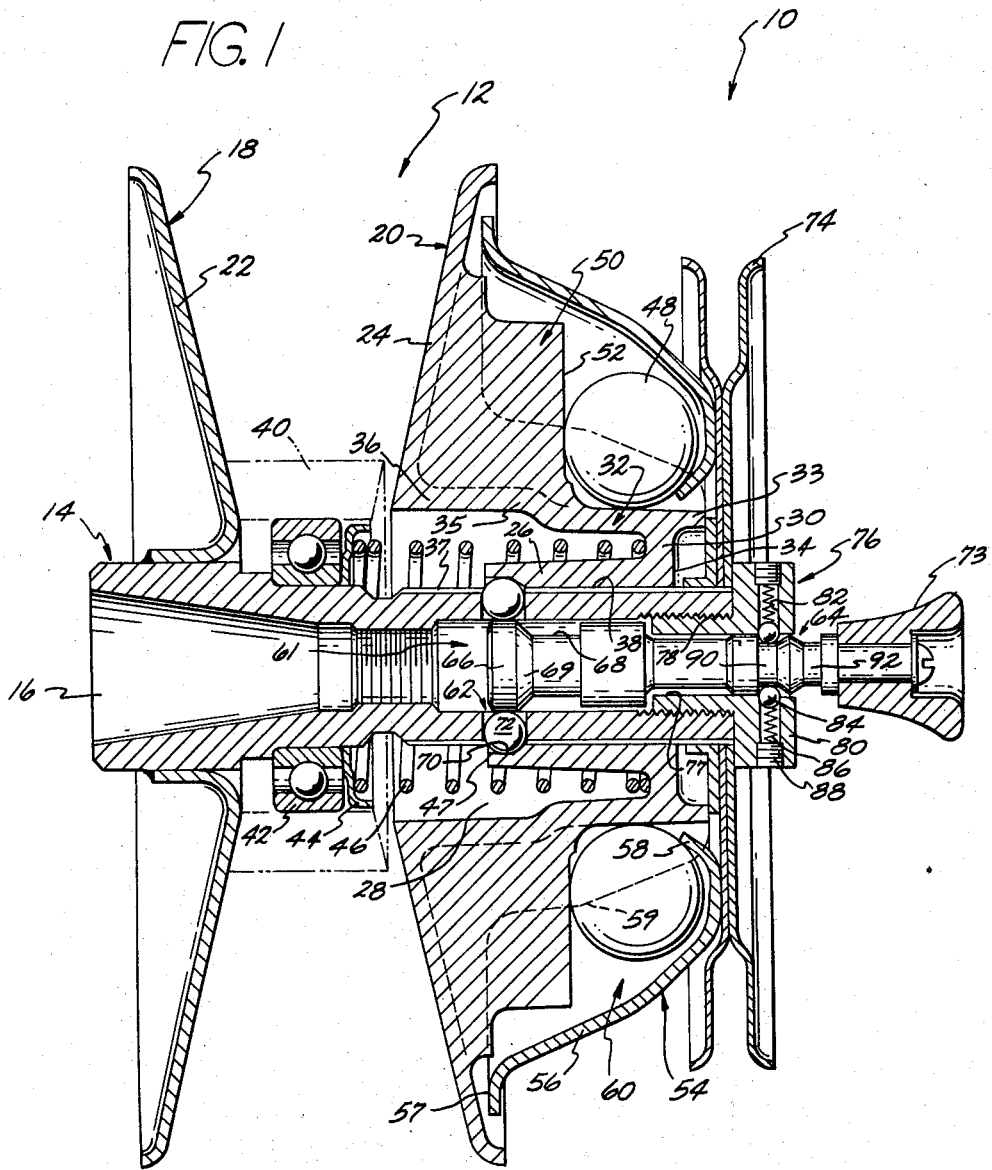
FIGURE 1 is a sectional view of a sheave drive in accordance with the present invention and showing the sheave drive in a neutral drive condition.

Referring now to the drawings and more particularly to FIGURE 1, the sheave drive of the present invention is broadly identified by the numeral 10 and generally comprises an axially separable sheave 12 carried by a shaft 14 having an end 16 adapted to be connected to suitable power source, not shown, for rotation of the shaft 14.

The axially separable sheave 12 includes first and second members 18 and 20 having respective acutely angularly related flanges 22 and 24.

The first member 18 is fixedly carried by the shaft 14. The second member 20 is provided with a cylindrical hub 26 including means defining a pocket 28 around the hub 26. Said means comprising a part 30 radially extending from the hub 26 and a cylindrical member 32 circumscribing the hub 26 and the part 30. The cylindrical member 32 has a first portion or end 33 extending beyond one end 34 of the hub 26, a second portion 35 extending around the hub 26 and a third portion 36 extending beyond the other end 47 of hub 26 and connected with the flange 24.

Figure 2:
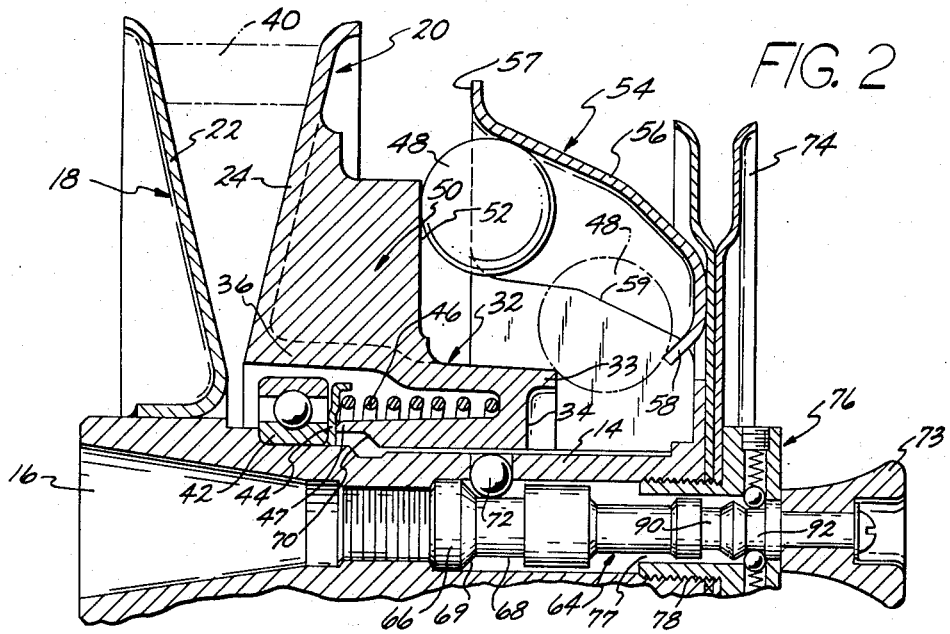
FIGURE 2 is a fragmentary sectional view similar to FIGURE 1 and showing the sheave drive in a drive condition.
Figure 3:
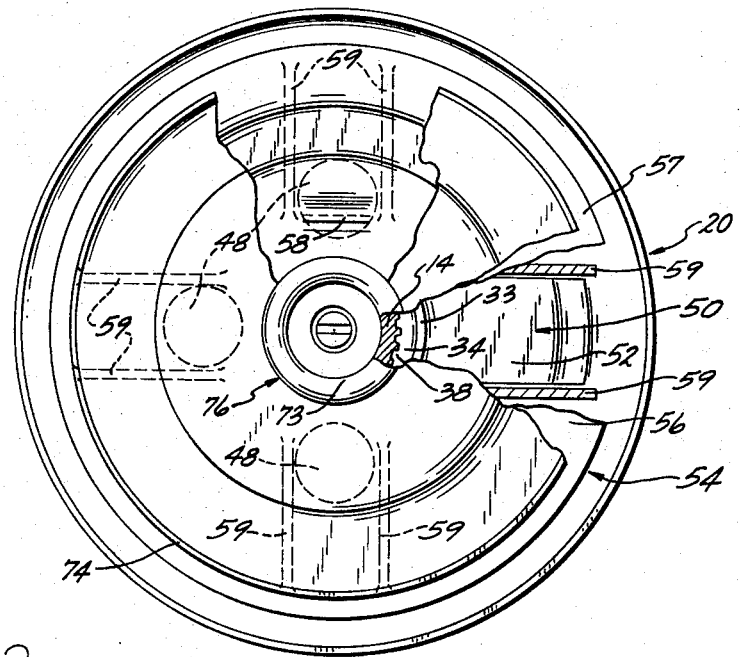
FIGURE 3 is an end elevational view on a reduced scale with parts removed and broken away.

Means are provided for mounting the second member 20 on the shaft 14 for rotation with and for axial movement relative to the shaft 14. In the disclosed construction, such means comprises a splined portion 37 on the shaft 14 complementarily received in a female splined portion 38 in the hub 26 to afford axial movement of the second member 20 between a position spaced relative to the first member 18 (as shown in FIGURE 1) and a position adjacent to the first member 18 (as shown in FIGURE 2). When the second member 20 is positioned in the adjacent position relative to first member 18, the respective flanges 22 and 24 of the first and second members 18 and 20 are positioned to drivingly engage a power transmission belt 40 (shown in FIG. 1 in phantom lines) to provide a power transmitting condition of the sheave drive 10, in which condition the side edges of the belt 40 engage the flanges 22 and 24. With the second member 20 in the spaced position relative to the first member 18, the respective flanges 22 and 24 are sufficiently spaced to allow the belt 40 to fit therebetween without driving engagement with the flanges 22 and 24 and to ride on a bearing 42 on the shaft 14 to provide a neutral drive condition wherein the sheave drive 10 does not transmit power.

Means are provided for normally biasing the second member 20 to the spaced or non-driving position. Such means comprises a spring stop 44 fixedly carried on the shaft 14 adjacent the bearing 42 and a coil spring 46 disposed between the spring stop 44 and the hub 26. One end of the spring 46 abuts the spring stop 44, and the other end of the spring 46 fits into the pocket 28 and abuts the radial part 30 with a portion of the spring 46 encircling the hub 26. In order to provide a force tending to hold the member 20 in the normally spaced position, the spring 46 is somewhat compressed when the second member 20 is in the spaced position. The biasing action of the spring 46 will maintain the second member 20 in the normally spaced position until some other force overcomes the biasing force of the spring and moves the second member 20. When the second member 20 is moved to the adjacent position, the end 47 of the hub 26 will abut the spring stop 44 to prevent further axial movement in that direction and the third portion 36 of the cylindrical member 32 will clear the spring stop 44 and the adjacent bearing 42.

Means operable upon rotation of the shaft 14 is provided for automatically moving the second member 20 from the normally spaced position to the adjacent position to afford driving engagement of the respective flanges 22 and 24 with the belt 40. In the preferred embodiment, such means comprises a series of actuating balls 48 disposed around the hub 26 and a series of parts 50 circumferentially spaced around the hub 26 and connected between the flange 24 and the cylindrical member 32. Each of the parts 50 defines a cam surface 52 which is shown in the preferred embodiment as being generally normal to the hub 26.

Said means for automatically moving the second member 20 also includes means for retaining the actuating balls 48 and for directing the movement of the balls 48, as by centrifugal force, into combined axial and radial movement relative to the shaft 14 whereby the balls 48 respectively engage the cam surfaces 52 and axially move the second member 20. In the disclosed construction, said ball retaining and directing means generally comprises a retainer housing 54 carried on the shaft 14 and having a bell-shaped portion 56 extending toward the flange 24. The bell-shaped portion 56 includes an end face 57 which is slightly spaced from the outer margin of the flange 24 when the second member 20 is in the normally spaced position and which is spaced from the flange 24 at a distance less than the diameter of the balls 48 when the second member 20 is in the adjacent position to prevent escape of the balls 48.

In order to prevent accidental displacement of the balls 48 between the end 33 and the retainer housing 54 in the event that the member 20 is displaced other than by centrifugal force to its adjacent position, the retainer housing 54 includes a series of ears or tabs 58 circumferentially spaced around the housing 54 and extending towards the flange 24. In such event, the balls 48 will be positioned as shown in phantom lines in FIGURE 2. The ears 58 are respectively axially aligned with the parts 50 and are sufficiently radially spaced from the shaft 14 to allow passage of the first or end portion 33 between the ears 58 and the shaft 14. The balls 48 are respectively separated from each other and caused to rotate with the shaft 14 by a series of pairs of partitions 59 which are carried by the bell-shaped housing portion 56 and which are respectively associated with each of the parts 50. More specifically, the partitions 59 in each pair are located on opposite sides of the respective circumferentially spaced ears 58 and immediately outwardly of the side faces of the associated parts 50.

When the second member 20 is in the normally spaced position, the first portion or end 33 of the cylindrical member 32 abuts the housing 54 which serves as a stop to prevent further axial movement of the second member 20 and the partitions 59 respectievly fit between the spaced parts 50. Furthermore, the partitions 59 in conjunction with the cam surfaces 52, the cylindrical member 32, the ears 58, and the bell-shaped portion 56 of the housing 54 form a series of chambers or compartments 60 respectively housing the balls 48. Of course, the chamber 60 is expandable upon axial movement of the second member 20 to the adjacent or power transmitting position.

Upon rotation of the shaft 14, the balls 48 initially mover adially outwardly of the shaft 14 under the action of centrifugal force and engage the bell-shaped portion 56 of the retainer housing 54 and are caused to move in a combined radial and axial direction. Upon rotation of shaft 14 above a certain speed, the balls 48 engage the bell-shaped portions 56 and the cam surfaces 52 with an axially directed force which is sufficient to overcome the biasing force of the spring 46 and axially move the second member 20 to the power transmitting position. The second member 20 will remain in this position as long as the shaft 14 is rotated above said certain speed. If the rotational speed of the shaft 14 falls below said certain speed, the centrifugal force will be sufficiently reduced to allow the biasing force of the spring 46 to move the second member 20 back to the normally spaced position.

Means are provided for releasably manually locking the second member 20 in the normally spaced position. In the preferred embodiment, such means generally comprises a central bore 61 in the shaft 14 and a series of radial bores 62 also in shaft 14 and communicating with the central bore 61. An actuator or rod 64 which is movable between a first or neutral lockout position (shown in FIG. 1) and a second or power transmitting position (shown in FIG. 2) is partially received in the central bore 61 with one end thereof extending beyond the end of the shaft 14. The rod 64 is provided with an end portion 66 which is of slightly less diameter than the bore 61 and which is alignable with the radial bores 62 when the rod is in the first or neutral lockout position. The rod 64 also includes a circular groove 68 which is relatively proximate the end portion 66 and which is alignable with the radial bore 62 when the rod 62 is in the second or power transmitting position. A conical portion 69 is disposed between the end portion 66 and the circular groove 68.

One end 47 of the hub 26 is provided with a circular notch or groove portion 70 which is also alignable with the radial bores 62 when the second member 20 is in the normally spaced position. Said manually locking means further includes a series of locking balls 72 respectively disposed in each of the radial bores 62. The diameter of each ball 72 is larger than the difference between the radii of the shaft 14 and the bore 61 so that the balls 72 protrude from the shaft 14 for engagement with the groove portion 70.

When the second member 20 is in the normally spaced position, the rod 64 can be manually moved between the first and second positions. A nob 73 is connected to the exterior end of the rod 64 to assist in manual movement thereof. In the normally spaced position, the second member 20 can be locked in the spaced position by moving the rod 64 to the first or neutral lockout position wherein the locking balls 72 engage the end portion 66 of the rod 64 and protrude from the exterior surface of the shaft 14 to also engage the groove or notch portion 70 of the hub 26. In this manner, the protruding portions of the balls 72 block axial movement of the second member 20 to provide a neutral lockout condition. By manually moving the rod 64 to the second or drive position, the balls 72 fall into the circular groove 68 on the rod 64, providing the sheave drive 10 is not rotating, to allow axial movement of the second member 20. When the sheave drive is rotating, centrifugal force holds the balls 72 in the bores 62, in which case, the balls 72 are forced into the groove 68 by the second member 20 as it is urged by the actuating balls 48 toward the power transmitting position. The conical portion 69 of the rod 64 serves as a cam surface to assist moving the balls 72 radially outwardly when the rod 64 is moved from the second or power transmitting position back to the first or neutral position.

A starter pulley 74 is fixed to the end of the shaft 14 adjacent the housing 54.

Means are provided for affording resistance to axial movement of the rod 64. Such means comprises an end element 76 having a central bore 77, a first threaded portion 78 threadedly received in the bore 61 of the shaft 14, and a flange portion 80 sandwiching the pulley 74 between the housing 54 and the flange portion 80. A portion of the rod 64 is received in the bore 77 of the end element 76. The flange portion 80 includes a series of the radial bores 82, detent balls 84 respectively disposed in bores 82 and bearing against rod 64, springs 86 respectively disposed in bores 82 and engaging detent balls 84, and screws 88 respectively threadedly received in the end of bores 82 and compressing the springs 86. When the rod 64 is in the first or neutral lockout position, the spring loaded balls 82 engage a first detent or groove 90 in the rod 64 (as shown in FIG. 1), and when the rod 64 is in the second or power transmitting position, the balls 82 engage a second detent or groove 92 in the rod 64, whereby there is provided a sufficient holding force for the rod 64 in either of the first and second positions.

Other means can be provided for automatically moving the second member 20, other than the balls 48 and retainer housing 54 arrangement as previously described. For example, the balls can be replaced by weights of other shapes, such as weights in the form of garter springs. A garter spring type weight would eliminate the requirement of the retaining means and of the splining arrangement between the second member 20 and the shaft 14.

Various of the features of the invention are set forth in the following claims.

What is claimed is:

1. A power transmission device comprising, a shaft adapted for connection to a power source and having a splined portion, first and second members having acutely angularly related flanges, said first member being fixed to said shaft and said second member including a hub having means defining a pocket around said hub and having a splined portion slidably engaged with said splined shaft portion for axial movement on said shaft between a normally spaced position and an adjacent position relative to said first member, a spring stop connected to said shaft, a helical spring extending generally coaxially with said shaft and disposed between said stop and said hub with one end thereof fitting in said pocket for biasing said second member to said normally spaced position to provide a neutral drive condition, means operable on rotation of said shaft for overcoming said spring and for moving said second member to said adjacent position to provide a power transmitting condition, and means for manually locking said second member in said spaced position to prevent said moving means from moving said second member upon rotation of said shaft.

2. The invention as set forth in claim 1 wherein, said moving means includes a series of actuating balls disposed around said hub, a series of radially extending cam surfaces circumferentially spaced around said hub, and means carried by said shaft for retaining said balls and for providing combined radial and axial movement of said balls upon shaft rotation whereby said balls bear against said cam surfaces and axially move said second member against the biasing action of said spring to said adjacent position to provide a power transmitting condition.

3. The invention as set forth in claim 1 wherein said manually locking means comprises a central bore in said shaft and a series of radial bores in said shaft and communicating with said central bore, a rod received in said bore and movable between first and second positions, said rod including an end portion alignable with said radial bores when said rod is in one of said first and second positions and including a circumferential groove proximate said end portion and alignable with said radial bores when said rod is in the other of said first and second positions, a groove portion in one end of said hub and being alignable with said radial bores when said second member is in said spaced position, and locking balls respectively disposed in said radial bores whereby when said rod is in said one of said first and second positions and said second member is in said spaced position, said balls engage said end portion and protrude from said shaft to also engage said hub groove portion thereby blocking axial movement of said second member and whereby when said rod is in said other of said first and second positions, said balls extend into said rod groove to allow axial movement of said second member.

4. The invention as set forth in claim 3 including means for affording resistance to axial movement of said rod comprising detent means on said rod and on said shaft, and a knob at the end of said rod to accommodate manually moving said rod.

5. A sheave drive for use with a power transmission belt comprising a shaft adapted to be driven by a power source and including a splined portion, a central bore, and a series of radial bores communicating with said central bore, first and second members having acutely angularly related flanges adapted for drivingly engaging the power transmission belt, said first member being fixed to said shaft and said second member including a hub having a splined portion slidably engaged with said splined shaft portion for axial movement on said shaft between a normally spaced and an adjacent position relative to said first member, said hub also having an end including a groove portion alignable with said radial bores when said second member is in said normally spaced position, a spring stop connected to said shaft, a spring disposed between said stop and said hub for biasing said second member to said normally spaced position to provide a neutral drive condition, a bearing connected to said shaft in juxtaposed position to said spring stop for carrying said power transmission belt when said second member is in said normally spaced position, a series of cam surfaces circumferentially spaced around said hub, a rod received in said bore and movable between first and second positions, said rod including an end portion alignable with said radial bores when said rod is in one of said first and second positions and including a circumferential groove relatively proximate said end portion and alignable with said radial bores when said rod is in the other of said first and second positions, a series of actuating balls disposed around said hub, a retainer housing carried on said shaft for retaining said balls and for providing combined radial and axial movement of said balls upon shaft rotation whereby said balls bear against said cam surface and axially move said second member against the biasing action of said spring to said adjacent position to provide a power transmitting condition, said housing including a series of spaced partitions for separating said actuating balls and for affording rotation of said actuating balls with said shaft, a locking ball respectively disposed in each of said radial bores of said hub, whereby when said rod is in said one of said first and second positions, said respective balls engage said end portion and protrude from said hub to engage said hub groove portion thereby blocking axial movement of said second member and whereby when said rod is in said other of said first and second positions, said respective balls extend into said rod grooves thereby allowing axial movement of said second member.

6. The invention as set forth in claim 5 including means for affording resistance to axial movement of said rod comprising detent means on said rod and on said shaft and a knob disposed on said rod to accommodate manually moving said rod.

7. A power transmission device comprising a shaft adapted for connection to a power source and having a splined portion, first and second members having acutely angularly related flanges, said first member being fixed to said shaft and said second member including a hub having a first spring stop and a splined portion slidably engaged with said splined shaft portion for axial movement on said shaft between a normally spaced position and an adjacent position relative to said first member, a second spring stop located on said shaft and spaced from said first member in the direction of said second member, a spring extending co-axially with said shaft between said stops for biasing said second member to said normally spaced position to provide a neutral drive condition, and means operable on rotation of said shaft for overcoming said spring and for moving said second member to said adjacent position to provide a power transmitting condition.

8. A power transmission device comprising a shaft adapted for connection to a power source and having a splined portion, first and second members having acutely angularly related flanges, said first member being fixed to said shaft and said second member including a hub having means defining a pocket around said hub and having a splined portion slidably engaged with said splined shaft portion for axial movement on said shaft between a normally spaced position and an adjacent position relative to said first member, a spring stop located on said shaft and spaced from said first member in the direction of said second member, a helical spring extending generally co-axially with said shaft and disposed between said stop and said hub with one end thereof fitting in said pocket for biasing said second member to said normally spaced position to provide a neutral drive condition, means operable on rotation of said shaft for overcoming said spring and for moving said second member to said adjacent position to provide a power transmitting condition, and means for manually locking said second member in said spaced position to prevent said moving means from moving said second member upon rotation of said shaft.

References Cited

UNITED STATES PATENTS

| | | | |
|---|---|---|---|
| 2,453,580 | 11/1948 | Lusk | 74—230.24 |
| 2,611,464 | 9/1952 | Rabe | 74—230.24 |
| 2,678,566 | 5/1954 | Oehrli | 74—230.17 |
| 2,715,842 | 8/1955 | Homuth | 74—230.17 |
| 2,795,962 | 6/1957 | Uhner | 74—230.17 |
| 2,941,421 | 6/1960 | Plott | 74—230.17 |
| 2,987,934 | 6/1961 | Thomas | 74—230.17 |

FOREIGN PATENTS

| | | |
|---|---|---|
| 200,016 | 3/1958 | Austria. |
| 3,453 | 9/1956 | Germany. |

MILTON KAUFMAN, *Primary Examiner.*

DAVID J. WILLIAMOWSKY, *Examiner.*

C. J. HUSAR, *Assistant Examiner.*